Figure 1:
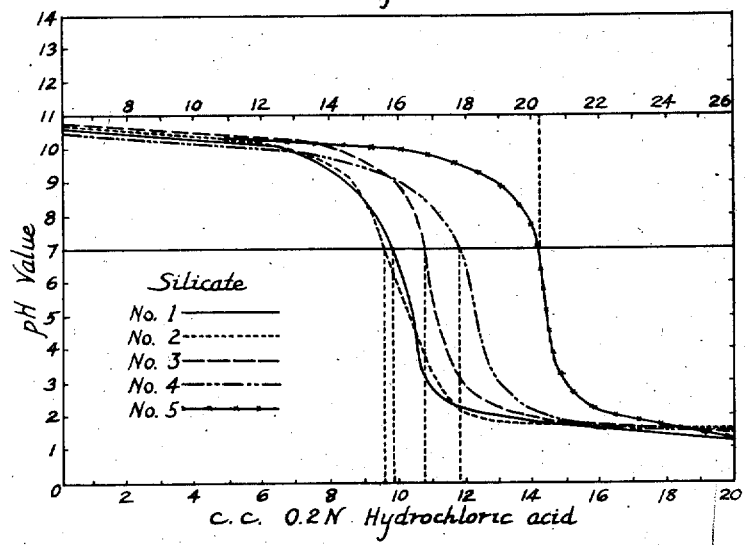

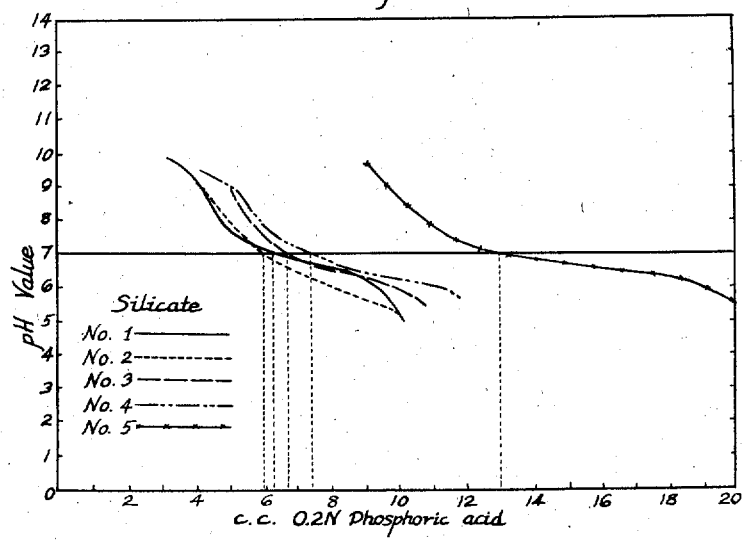
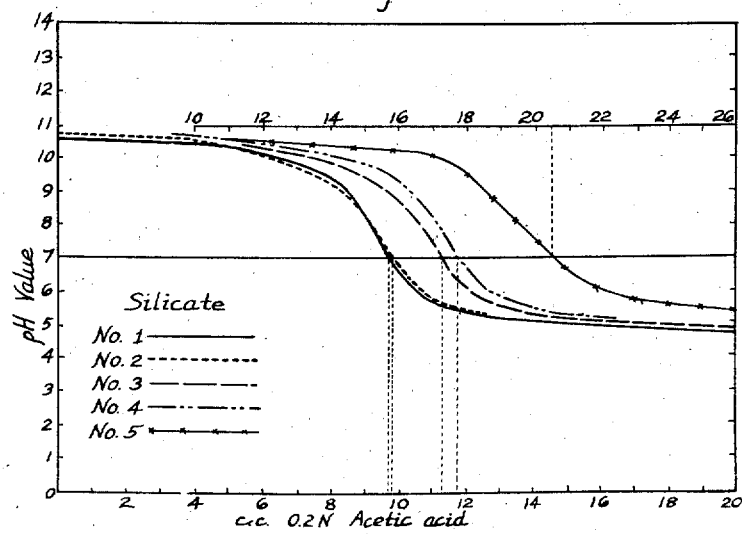

Nov. 9, 1937.  A. A. HENDRICKSON  2,098,918
BACTERIA CULTURE AND PRODUCTION THEREOF
Filed May 14, 1934  3 Sheets-Sheet 3

Inventor:
Adolph A. Hendrickson
By Wilson, Dowell, McCanna & Foley
Attys.

Patented Nov. 9, 1937

2,098,918

UNITED STATES PATENT OFFICE 2,098,918

BACTERIA CULTURE AND PRODUCTION THEREOF

Adolph A. Hendrickson, Oak Park, Ill., assignor to The Albert Dickinson Company, Chicago, Ill., a corporation of Illinois Application May 14, 1934, Serial No. 725,587

4 Claims. (Cl. 195—59)

This invention relates to bacteria cultures and production thereof.

For successful commercial production of bacteria cultures, it is important to obtain culture media favorable to the growth and longevity of the organisms, and to be able to prepare such media and to obtain the cultures thereon with reasonable facility and economy.

By prolonged investigations, study and experiments, working principally though not exclusively with bacteria of the genus known as Rhizobium, I have ascertained that successful cultures thereof can be produced on a commercial scale with the use of silicate gels as culture media, which gels can be manufactured from cheap materials in an easy manner; and that by following certain procedures and modified procedures it is possible to obtain advantageous effects both with respect to the production of improved cultures and with respect to the physical-chemical properties of the culture media, affecting their practicability for preparation, commercial handling and use.

Rhizobium, of which there are a number of species, are soil bacteria which play an important role in the growth of leguminous plants and soil enrichment. These bacteria when flourishing in the soil in which legumes are grown infect the roots of the plants, forming nodules on the roots, and they cause these plants to derive nitrogen from the atmosphere, with the effect of promoting plant growth, development and crop yield in a marked degree, while at the same time conserving the nitrogen content of the soil. So important is the function of these root nodule bacteria that it is now commonly recognized to be highly desirable to introduce into the soil in which alfalfa, clover, peas, soy beans or other leguminous crop is to be grown the proper root nodule bacteria for the particular crop. One convenient way of introducing such bacteria into the soil is by seed inoculation, namely by moistening the seed to be sown with water infested with the bacteria. Rhizobium cultures, which in the past have usually been grown on an agar base, are distributed to farmers and planters for use for this purpose.

Commercial Rhizobium cultures fully as satisfactory from the biological standpoint as those grown on the customary agar media, and in many instances of superior luxuriousness and infective ability, are prepared in accordance with practices evolved by the present invention, and the media for these cultures are also of more practical character and better for commercial handling, transportation and adaptation to the farmer's needs.

Figure 6:
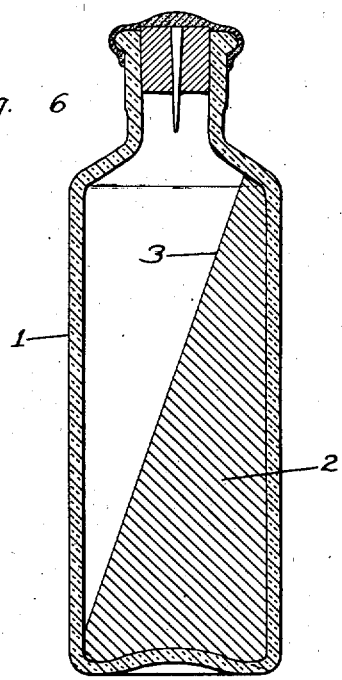

In connection with this description, reference is made to the accompanying drawings, in which Figs. 1 to 5 are diagrams hereinafter explained indicating reactions between certain silicates and acids, and Fig. 6 represents a bottle containing a commercial Rhizobium culture produced in accordance with the present invention.

In Fig. 6, the numeral 1 denotes a bottle containing a gel 2 on the slanting surface 3 on which is a growth of Rhizobium which in some instances may appear as a film and in other instances as a slimy film. The package represented by this bottle is intended for inoculation of a bushel of seed. In use the farmer fills the bottle with water, shakes thoroughly to remove the bacteria from the gel, and pours the water into a cup. Repeating this operation several times, the farmer accumulates a pint of water infested with the bacteria, which he pours over the seed, mixing the seed thoroughly to cause them to be uniformly moistened. The seeds are now inoculated and in a few minutes will be dry enough to be sown.

Silicate gels for use as culture media may be prepared from various silicates and acids. There are many commercial brands of silicates on the market which afford a cheap and unlimited supply of silicate. However to avoid undesirable toxic effects which might be detrimental to the growth of the organisms, it is importantly advantageous to employ silicates, either sodium or potassium, having a sodium-silicon dioxide ratio ($Na_2:SiO_2$) or a potassium-silicon dioxide ratio ($K_2:SiO_2$) of 1:3 to 1:4. In producing gels of different specific compositions for use as culture media for different species of Rhizobium and other nitrogen fixing bacteria, I have found that satisfactory results can be obtained with various silicates having a ratio of sodium or potassium to silicon dioxide within the range stated. The silicate which I have found most satisfactory among those with which I have worked, is a sodium silicate having a molecular ratio $Na_2:SiO_2=1:3.76$ and another which is nearly as satisfactory is a sodium silicate having a molecular ratio $Na_2:SiO_2=1:3.35$.

The characteristics of the gel are affected by the composition of the original silicate, and therefore in order to produce uniform gels over and over again, and to avoid the tedious work of experimentation and mathematical determinations, it is necessary to standardize practice by adopting a specific grand of original silicate as the basis for manufacture of gels of any specific composition and character. Having selected an appropriate silicate, the first step in my practice is to prepare a stock solution of such silicate by dilution in water to obtain any desired silicon dioxide concentration convenient as a basis for subsequent procedure. For this purpose, the silicon dioxide concentration of the original silicate may be determined by either the gravimetric or volumetric method, and the amount of water for dilution to obtain the desired molecular concentration of silicon dioxide in the stock solution may be ascertained by mathematical calculation as well understood by physicists and chemists. A silicon dioxide concentration of 2.00 mols per liter is very convenient and satisfactory, such a concentration being sufficiently high for all purposes and the integer 2 being conveniently divisible. However any concentration may be used and diluted as required.

Having thus produced, as a stock solution or working solution, a dilute solution of the selected silicates with such a predetermined molecular concentration of silicon dioxide as to give a convenient number of mols $SiO_2$ per liter for any mathematical determinations which may be desired, the liquid to form the gels is prepared by combining proper proportions of such silicate solutions and water, acid or acids and other materials as required for the specific composition and character of the gels to be formed. Any organic or inorganic acid may be used in combination with a silicate solution to produce silicate gels. However in the production of these gels there are a number of factors to be considered. Among these are the silicon dioxide concentrations of the media itself, and its hydrogen ion concentration or pH value. The proportions of different acids which may be used in the preparation of the gels must therefore be determined with reference to these and other considerations hereinafter discussed.

The silicon dioxide concentration of the final liquid should be sufficiently high to permit the formation of the gels but sufficiently low to allow the necessary time for the pouring of the liquid into the bottles or containers therefor and for such handling of the containers as may be necessary or incident to the process of manufacture, before the gels form. As a matter of practical convenience, it is usually desirable to have at least fifteen minutes between the time of mixing the silicate solution and acids and the time at which gel formation takes place, in order to facilitate manufacture of these gels on a large scale. It is accordingly desirable to work with a liquid having a silicon dioxide concentration substantially under one mol. per liter. The results of extensive investigations show that the time for the formation and setting of the gels increases as the silicon dioxide concentration decreases. On the other hand hardness of the gels increases with the increase of silicon dioxide concentration. The effects on the growth on the bacteria organisms seem to improve with the decrease of silicon dioxide concentration, other conditions being the same; and with my preferred compositions I find that the best results in the biological aspects are obtained with media having a silicon dioxide concentration of from 0.10 to 0.20 mol. per liter, promoting luxuriant growth and more slime which is an indication of infectiveness or ability of bacteria to infect the plant; also increasing the number of organisms which will grow on the media.

The hydrogen ion concentration or pH value of the gels is also important both as affecting the growth and development of the bacteria organisms and the time of formation and setting of the gels. While some of the Rhizobium bacteria will grow on media that are acid or alkaline, e. g. below pH 6 or above pH 8, yet it is in general desirable for optimum biological effects to have a medium which is substantially neutral or neither markedly acid or markedly alkaline, i. e. having a pH value at or near 7, say between pH 6.8 and pH 7.2, for certain organisms require and others grow and develop more favorably on such a neutral medium. The gels form and set more rapidly at this desired pH value of the gel liquid than at higher and lower values, but any disadvantage in this regard may be offset by adjusting the silicon dioxide concentration of the gel liquid to a low concentration and also by other factors presently to be discussed. Different acids which may be used in combination with the silicate solution to produce the liquid to form the gels, must be used in quite different proportions, and these proportions are variously affected by the silicon dioxide concentration required for the gel liquid, and to some extent by the original silicates from which the silicon solution is formed. The time for gel formation and the hardness or toughness of the gels, upon which their ability to withstand shipment depends, are also differently affected by different acids, and to some extent by the composition of the original silicates. Phosphoric acid is by far the best of any which I have thus far discovered for use in combination with the silicate solution to form the gels, or for use as the basic acid for the gel formation, its advantages among others being that it has its greatest buffering capacity at about pH 7, that it furnishes phosphates which are necessary nutrients for the culture media, and that gels made with the phosphoric acid, other conditions being equal, form and set more slowly than the gels formed with other acids with which I have worked. While therefore my invention in its broader aspects contemplates the production of the gels by the use of various acids, the use of phosphoric acid is claimed as a special feature of the invention.

As illustrative examples, and for convenient use in practicing the invention, reference will now be made to certain determinations based on the use of certain specific original silicates and certain specific acids. The specific silicates herein referred to are five well known commercial silicates, each in a concentrated solution form, i. e. comprising a silicate in admixture with water. These silicates are for convenience designated herein as silicates Nos. 1, 2, 3, 4 and 5, and are identified as follows:

No. 1, a sodium silicate ($Na_2SiO_3$) having a molecular ratio $Na_2:SiO_2=1:3.76$, and a molecular concentration of 5.165 mols $SiO_2$ per liter, this being commercially known as the "S" brand, No. 2, a potassium silicate ($K_2SiO_3$) having a molecular ratio $K_2:SiO_2=1:3.80$ and having a molecular concentration of 3.979 mols $SiO_2$ per liter, No. 3, a sodium silicate commercially known as the "J. M." brand, having a molecular ratio $Na_2:SiO_2=1:3.35$ and a molecular concentration of 6.868 mols $SiO_2$ per liter, No. 4, a sodium silicate commercially known as Grade 40, having a molecular concentration 6.505 mols $SiO_2$ per liter, No. 5, a sodium silicate commercially known as Grade 60, having a molecular concentration 9.518 mols $SiO_2$ per liter.

The molecular concentrations of these silicates were determined by the gravimetric method, and other determinations thereof by the volumetric method were found to approximate the first mentioned determinations sufficiently for acceptance of the volumetric determinations for practical purposes.

From these specific silicate solutions, hereinafter referred to as the original silicates, I prepared dilute stock solutions, each being a standard solution having 2.00 mols $SiO_2$ per liter. From such a stock solution it is a comparatively simple matter to prepare a more dilute solution; for example one liter of silicate solution with nine liters of water will make ten liters of a solution having 0.20 mol. $SiO_2$ per liter. On account of the convenient index of the molecular concentration, it is also relatively simple to prepare gel liquids of approximately desired silicon dioxide molecular concentrations.

Working with uniform volumes of these different silicate solutions, prepared from the different original silicates, I conducted many tests to determine the effects of varying amounts of various acids upon the pH value of the different silicates. In these tests I employed normal acid solutions of 0.20 normal concentration. In each test, a selected unit volume of 2 c. c. silicate solution was mixed with a definite volume of water and a definite volume of 0.20 normal concentration acid solution to give a total volume of 25 c. c.; and immediately after adding the acid solution to the silicate solution the pH value of the liquid was determined potentiometrically with the glass electrode. For example, as a part of a series of tests with a silicate solution prepared from the No. 1 original silicate, and with a solution of hydrochloric acid (HCl) of a normal concentration of 0.20, it was found that the addition to the silicate solution of 8 c. c. of said normal acid solution gave pH 9.50, while with 10 c. c. of said acid solution added to said silicate solution the determination was pH 7.28. Such addition of 10 c. c. of said acid solution to each of the several silicate solutions gave for the No. 1 silicate a determination of pH 7.28; for the No. 2 silicate a determination of pH 5.91; for the No. 3 silicate a determination of pH 8.92; for the No. 4 silicate a determination of pH 8.92; and for the No. 5 silicate a determination of pH 10.40. These determinations are fairly typical of many of the variations encountered throughout the tests in applying different acids to the different silicon solutions, but my investigations indicate that with the use of phosphoric acid there is somewhat less variation in the pH values of comparative liquids produced from several of the original silicates.

Figure 2:
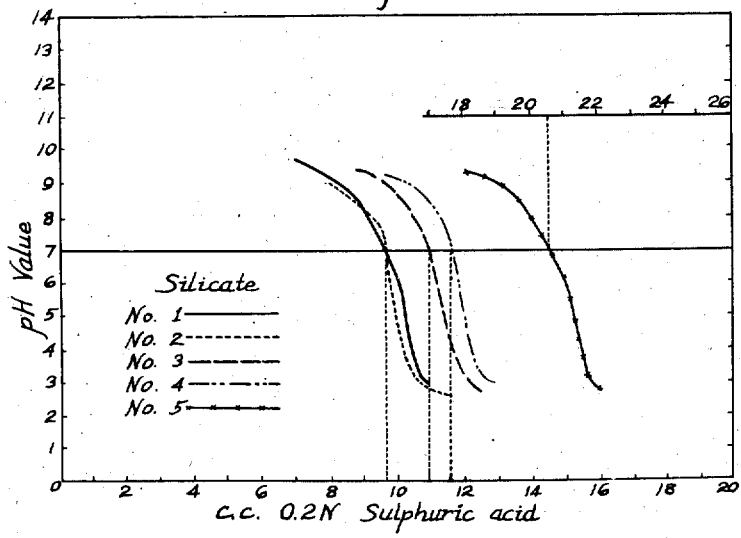
Figure 5:
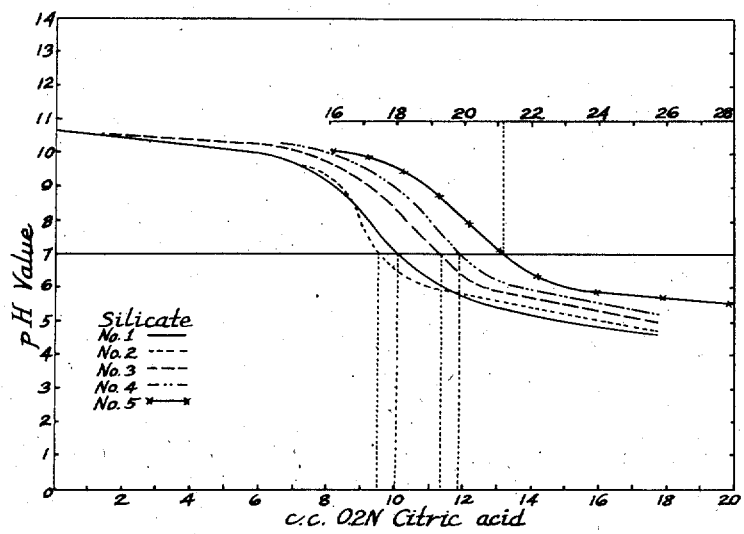

Figs. 1 to 5 of the accompanying drawings are diagrams made up from data obtained from many tests as above described, indicating by the plotted curves the effects of varying amounts of different specific acids on the pH value of gel liquids made up from different silicate solutions, the points from which the curves are plotted representing coordinates which are the said amounts of acid and pH values. In each of these diagrams the divisions of the bottom horizontal line (and also of the top scale in Figs. 1, 2, 4 and 5) represent amounts in cubic centimeters of a specific acid solution of a predetermined normal concentration, in this instance having a concentration of 0.20, added to 2 c. c. of a stock silicate solution which with a definite amount of water and the added acid solution make up the constant total volume of 25 c. c. The divisions of the vertical line or axis represent pH values. The full curved line is plotted from coordinates representing acid additions and pH values for a liquid made from the stock solution produced from the No. 1 original silicate, said stock solution having a molecular concentration of silicon dioxide of 2 mols per liter as aforesaid. The dotted line curve is similarly plotted with reference to the stock solution made from the No. 2 silicate. The dash line curve similarly refers to the No. 3 silicate. The curve in dash and dotted lines refers to the No. 4 silicate, and the curve in full lines with spaced cross marks refers to the No. 5 silicate. On the several diagrams are key indications of the respective curves. Fig. 1 is based on the use of hydrochloric acid (HCl) diluted to a normal concentration of 0.20. Fig. 2 is based on the use of sulphuric acid ($H_2SO_4$) in a similar dilute 0.20 normal concentration. Fig. 3 is based upon the use of phosphoric acid ($H_3PO_4$) of like dilute 0.20 normal concentration. Fig. 4 is based on the use of acetic acid and Fig. 5 upon the use of citric acid, these being also dilute solutions of said normal concentration of 0.20.

These diagrams reveal what may be termed the buffer capacities of the different acid solutions and stock silicate solutions in the sense of the variation and amounts of the respective acids which may be used with the respective stock solutions to obtain a reaction of or near pH 7.0. The amount of acid required to produce silicate gels of pH 7.0 may be obtained by drawing a line perpendicular to the abscissa at the point pH 7.0 on these titration curves. By reference to Fig. 3 it is apparent that phosphoric acid has a greater buffer capacity at about pH 7.0, as indicated by the flat portion of the several curves at this point, than have the other acids. This indicates that at about pH 7.0 there is considerable freedom as to the amount of phosphoric acid which may be added to any of the silicate solutions without causing any considerable change in the pH value of the medium; which is of great practical advantage since it permits the production of a medium with the desired pH value 7 or between pH 6.8 and pH 7.2 with less exactitude or precision than would otherwise be required. Since a reaction of pH 7.0 is desirable for the growth of Rhizobium and the phosphate salts supplied by phosphoric acid are necessary for the growth of the bacteria, the use of this acid accomplishes the two-fold function of affording buffer capacity and supplying nutrients. As appears from Figs. 4 and 5, the acetic acid and citric acid solutions have less buffering capacity at pH 7.0 than the phosphoric acid, the acetic acid being buffered at about pH 5.0 and the citric acid being buffered at about pH 6.0; so that from the standpoint of production of media of the desired pH value the use of the acetic and citric acids would require greater exactitude than the use of the phosphoric acid. As appears from Figs. 1 and 2, the curves based on the use of the hydrochloric and sulphuric acids are steep at pH 7.0, showing that these acids are poor buffers at this reaction; and preferably therefore they should be used only in the smallest amounts necessary to furnish anions needed for the growth of the organisms. Silicate gels of the desired pH value can be successfully produced with these several acids and other acids; but it is evident that the preparation of the gels with phosphoric acid, or the use of phosphoric acid as the principal acid in the preparation of the gels, is of special advantage on account of the greater buffering capacity of the phosphoric acid at pH 7.0, as compared with the other acids, and the constituents which it furnishes for the growth of the nodule producing organisms. Phosphoric acid has other advantages, principally in promoting slow formation and the setting of the gels. Also, other conditions being equal, gels being formed with the phosphoric acid appear to be slightly harder than those formed with hydrochloric or sulphuric acid.

By proper calculations from the aforesaid diagrams, the following tables I to V have been prepared for use in preparing silicate gels from the several aforesaid original silicates and with phosphoric, sulphuric and hydrochloric acids. Each of said tables is based upon the use of a stock silicate solution made from a specified original silicate and having a molecular concentration of silicon dioxide of 2.00 mols per liter, and upon the use of specified acid solutions each of a normal concentration. Each table gives amounts of silicate solution, acid solution and water for a total volume of ten cubic centimeters. Table I gives the amounts for preparing 10 c. c. silicate gel liquid, using a stock silicate solution prepared from the No. 1 original silicate. The remaining tables give corresponding amounts for 10 c. c. silicate gel liquid, using stock silicate solutions made respectively from the original silicates Nos. 2, 3, 4 and 5.

TABLE I

*No. 1 original silicate*

| Acid | c.c. silicate solution | c.c. N acid solution | c.c. water | Mols SiO$_2$ per liter |
|---|---|---|---|---|
| H$_3$PO$_4$ | 0.5 | 0.32 | 9.18 | 0.1 |
| H$_3$PO$_4$ | 0.75 | 0.48 | 8.77 | 0.15 |
| H$_3$PO$_4$ | 1.0 | 0.64 | 8.36 | 0.2 |
| H$_3$PO$_4$ | 1.5 | 0.96 | 7.54 | 0.3 |
| H$_3$PO$_4$ | 2.0 | 1.28 | 6.72 | 0.4 |
| H$_3$PO$_4$ | 2.5 | 1.6 | 5.9 | 0.5 |
| H$_2$SO$_4$ | 0.5 | 0.49 | 9.01 | 0.1 |
| H$_2$SO$_4$ | 0.75 | 0.735 | 8.515 | 0.15 |
| H$_2$SO$_4$ | 1.0 | 0.98 | 8.02 | 0.2 |
| H$_2$SO$_4$ | 1.5 | 1.47 | 7.03 | 0.3 |
| H$_2$SO$_4$ | 2.0 | 1.96 | 6.04 | 0.4 |
| H$_2$SO$_4$ | 2.5 | 2.45 | 5.05 | 0.5 |
| HCl | 0.5 | 0.48 | 9.02 | 0.1 |
| HCl | 0.75 | 0.72 | 8.53 | 0.15 |
| HCl | 1.0 | 0.96 | 8.04 | 0.2 |
| HCl | 1.5 | 1.44 | 7.06 | 0.3 |
| HCl | 2.0 | 1.92 | 6.08 | 0.4 |
| HCl | 2.5 | 2.40 | 5.10 | 0.5 |

TABLE II

*No. 2 original silicate*

| Acid | c.c. silicate solution | c.c. N acid solution | c.c. water | Mols SiO$_2$ per liter |
|---|---|---|---|---|
| H$_3$PO$_4$ | 0.5 | 0.3 | 9.2 | 0.1 |
| H$_3$PO$_4$ | 0.75 | 0.45 | 8.8 | 0.15 |
| H$_3$PO$_4$ | 1.0 | 0.6 | 8.4 | 0.2 |
| H$_3$PO$_4$ | 1.5 | 0.9 | 7.6 | 0.3 |
| H$_3$PO$_4$ | 2.0 | 1.2 | 6.8 | 0.4 |
| H$_3$PO$_4$ | 2.5 | 1.5 | 6.0 | 0.5 |
| H$_2$SO$_4$ | 0.5 | 0.48 | 9.02 | 0.1 |
| H$_2$SO$_4$ | 0.75 | 0.72 | 8.53 | 0.15 |
| H$_2$SO$_4$ | 1.0 | 0.96 | 8.04 | 0.2 |
| H$_2$SO$_4$ | 1.5 | 1.44 | 7.06 | 0.3 |
| H$_2$SO$_4$ | 2.0 | 1.92 | 6.08 | 0.4 |
| H$_2$SO$_4$ | 2.5 | 2.40 | 5.10 | 0.5 |
| HCl | 0.5 | 0.48 | 9.02 | 0.1 |
| HCl | 0.75 | 0.72 | 8.53 | 0.15 |
| HCl | 1.0 | 0.96 | 8.04 | 0.2 |
| HCl | 1.5 | 1.44 | 7.06 | 0.3 |
| HCl | 2.0 | 1.92 | 6.08 | 0.4 |
| HCl | 2.5 | 1.92 | 6.08 | 0.5 |

TABLE III

*No. 3 original silicate*

| Acid | c.c. silicate solution | c.c. N acid solution | c.c. water | Mols SiO$_2$ per liter |
|---|---|---|---|---|
| H$_3$PO$_4$ | 0.5 | 0.34 | 9.16 | 0.1 |
| H$_3$PO$_4$ | 0.75 | 0.51 | 8.74 | 0.15 |
| H$_3$PO$_4$ | 1.0 | 0.68 | 8.32 | 0.2 |
| H$_3$PO$_4$ | 1.5 | 1.02 | 7.48 | 0.3 |
| H$_3$PO$_4$ | 2.0 | 1.36 | 6.64 | 0.4 |
| H$_3$PO$_4$ | 2.5 | 1.70 | 5.80 | 0.5 |
| H$_2$SO$_4$ | 0.5 | 0.54 | 8.96 | 0.1 |
| H$_2$SO$_4$ | 0.75 | 0.81 | 8.44 | 0.15 |
| H$_2$SO$_4$ | 1.0 | 1.08 | 7.92 | 0.2 |
| H$_2$SO$_4$ | 1.5 | 1.62 | 6.88 | 0.3 |
| H$_2$SO$_4$ | 2.0 | 2.16 | 5.84 | 0.4 |
| H$_2$SO$_4$ | 2.5 | 2.7 | 4.8 | 0.5 |
| HCl | 0.5 | 0.55 | 8.95 | 0.1 |
| HCl | 0.75 | 0.825 | 8.425 | 0.15 |
| HCl | 1.0 | 1.1 | 7.9 | 0.2 |
| HCl | 1.5 | 1.65 | 6.85 | 0.3 |
| HCl | 2.0 | 2.2 | 5.8 | 0.4 |
| HCl | 2.5 | 2.75 | 4.75 | 0.5 |

TABLE IV

*No. 4 original silicate*

| Acid | c.c. silicate solution | c.c. N acid solution | c.c. water | Mols SiO$_2$ per liter |
|---|---|---|---|---|
| H$_3$PO$_4$ | 0.5 | 0.37 | 9.13 | 0.1 |
| H$_3$PO$_4$ | 0.75 | 0.555 | 8.695 | 0.15 |
| H$_3$PO$_4$ | 1.0 | 0.74 | 8.26 | 0.2 |
| H$_3$PO$_4$ | 1.5 | 1.11 | 7.39 | 0.3 |
| H$_3$PO$_4$ | 2.0 | 1.48 | 6.52 | 0.4 |
| H$_3$PO$_4$ | 2.5 | 1.85 | 5.65 | 0.5 |
| H$_2$SO$_4$ | 0.5 | 0.58 | 8.92 | 0.1 |
| H$_2$SO$_4$ | 0.75 | 0.87 | 8.38 | 0.15 |
| H$_2$SO$_4$ | 1.0 | 1.16 | 7.84 | 0.2 |
| H$_2$SO$_4$ | 1.5 | 1.74 | 6.76 | 0.3 |
| H$_2$SO$_4$ | 2.0 | 2.32 | 5.68 | 0.4 |
| H$_2$SO$_4$ | 2.5 | 2.90 | 4.60 | 0.5 |
| HCl | 0.5 | 0.59 | 8.91 | 0.1 |
| HCl | 0.75 | 0.885 | 8.365 | 0.15 |
| HCl | 1.0 | 1.18 | 7.82 | 0.2 |
| HCl | 1.5 | 1.77 | 6.73 | 0.3 |
| HCl | 2.0 | 2.36 | 5.64 | 0.4 |
| HCl | 2.5 | 2.95 | 4.55 | 0.5 |

TABLE V

*No. 5 original silicate*

| Acid | c.c. silicate solution | c.c. N acid solution | c.c. water | Mols SiO$_2$ per liter |
|---|---|---|---|---|
| H$_3$PO$_4$ | 0.5 | 0.65 | 8.85 | 0.1 |
| H$_3$PO$_4$ | 0.75 | 0.975 | 8.275 | 0.15 |
| H$_3$PO$_4$ | 1.0 | 1.30 | 7.70 | 0.2 |
| H$_3$PO$_4$ | 1.5 | 1.95 | 6.55 | 0.3 |
| H$_3$PO$_4$ | 2.0 | 2.60 | 5.40 | 0.4 |
| H$_3$PO$_4$ | 2.5 | 3.25 | 4.25 | 0.5 |
| H$_2$SO$_4$ | 0.5 | 1.03 | 8.47 | 0.1 |
| H$_2$SO$_4$ | 0.75 | 1.545 | 7.705 | 0.15 |
| H$_2$SO$_4$ | 1.0 | 2.06 | 6.94 | 0.2 |
| H$_2$SO$_4$ | 1.5 | 3.09 | 5.41 | 0.3 |
| H$_2$SO$_4$ | 2.0 | 4.12 | 3.88 | 0.4 |
| H$_2$SO$_4$ | 2.5 | 5.15 | 2.35 | 0.5 |
| HCl | 0.5 | 1.01 | 8.49 | 0.1 |
| HCl | 0.75 | 1.515 | 7.735 | 0.15 |
| HCl | 1.0 | 2.02 | 6.98 | 0.2 |
| HCl | 1.5 | 3.03 | 5.47 | 0.3 |
| HCl | 2.0 | 4.04 | 3.96 | 0.4 |
| HCl | 2.5 | 5.05 | 2.45 | 0.5 |

From these tables, a medium having a reaction of approximately pH 7.0 may be prepared of any desired molecular concentration and in any quantity since the calculations are based on 10 c. c. of medium. In preparing the gels with phosphoric acid as the principal acid, suitable proportions of the other acids may be included to furnish desired nutrients. In this connection, as appears from the tables, the effect upon the pH value and silicon dioxide molecular concentration of 1 c. c. of phosphoric acid approximates the effect of 1.5 c. c. of hydrochloric or sulphuric acid. These several acids supply desirable anions, the phosphoric acid furnishing the phosphate radical $PO_4$, the sulphuric acid furnishing the sulphate radical $SO_4$ and the hydrochloric acid supplying chlorine. Various inorganic acids may be used to give desired nutrient elements, and various organic acids, alcohols, sugars or other carbohydrates may be included in the media to furnish nutrients or energy for the growth of the bacteria; while in addition agar may be included to give greater strength to the gels; agar additions ranging from 0.1 to 2.0% being desirable particularly in the gels of extremely low silicon dioxide concentration. Nitrogen may be supplied to the medium by yeast water, adding 100 c. c. of ten per cent solution of yeast water per liter of medium to the silicate solution before adding the acids. For supplying energy, 10 grams per liter of medium of sugar, alcohol or other carbohydrates, e. g. mannitol or sucrose, may be included, the sugar or other carbon supplying agent being usually incorporated in the yeast water which is mixed with the silicate before adding the acids.

Referring for comparison to an ordinary culture medium formed from a solution of agar with mannitol and yeast water, and having 0.5 gm. $K_2HPO_4$ per liter of media to supply the phosphate radical $PO_4$, and 0.2 gm. $MgSO_4$ per liter of medium to supply the sulphate radical $SO_4$, and 0.1 gm. NaCl per liter of medium to supply chlorine, which are ample for these anions and more than necessary in many cases, I have determined that the equivalent amounts of said phosphate, sulphate and chlorine may be had by the use per liter of medium of 8.216 c. c. normal solution of phosphoric acid, 3.31 c. c. normal solution sulphuric acid, and 1,708 c. c. normal solution hydrochloric acid, these figures being mathematical determinations, and not at all necessary to be followed with any exactness for obtaining proper supplies of these anions.

By the aid of Tables I to V, gels having the desired ingredients with the reaction of approximately pH 7.0 and any desired $SiO_2$ molecular concentration, may be prepared. For example, if the gels are to be produced from the stock silicate solution made from the No. 1 original silicate, the preparation of a liter of medium having a reaction of pH 7.0, a molecular concentration of 0.2 mol. $SiO_2$ per liter, and approximately the same amounts of the anions $PO_4$, $SO_4$ and Cl as in the ordinary agar-mannitol medium above referred to, would require 100 c. c. silicate (2.0 mols $SiO_2$ per liter) solution, 2 c. c. of NHCl, 3 c. c. $NH_2SO_4$, 61 c. c. $NH_3PO_4$, 100 c. c. of 10% yeast water, 10 grams of sugar and 734 c. c. distilled water. The acids should be added last. If agar is desired in the medium to give greater strength, it is dissolved in 500 c. c. of distilled water and added to the medium before the acids are added. During my investigations this medium has been prepared many times with varying quantities of agar and without exception the reaction has been approximately pH 7.0.

The oxidation-reduction potential of the media may be adjusted to stimulate or promote growth of bacteria by the addition of potassium permanganate $KMnO_4$, ferric-ammonium citrate, hydrogen peroxide ($H_2O_2$) or other oxidizing agents, and/or the addition of sodium thiosulphate, thioglycolic acid, ferrous sulphate ($FeSO_4.7H_2O$) or other reducing agents. Such oxidizing or reducing agents are not necessary for the development of some of the Rhizobium cultures such as those for the alfalfa, red clover, peas, beans and soy beans, but I have found that various organisms of Rhizobium respond more favorably in some instances to additions of oxidizing agents and in some instances to additions of reducing agents. This indicates that various organisms may be successfully cultured which would not ordinarily develop on silicate gels, and indicates the possibility of isolating and successfully growing cultures of bacteria which are difficult to isolate or which would ordinarily not grow.

The acids used in the preparation of the gels, as well as the silicate solutions, should be standardized. Because of their convenience normal acid solutions are preferably used, wherefore the aforesaid Tables I to V are based on the use of normal acid solutions. By the use of standardized solutions of known concentration, the procedure may be repeated as frequently as desired and gels of uniform chemical composition and physical characteristics assured. The type and composition of the gel which one desires may be regulated by the amounts of silicate and acid solutions, or any other ingredients that are added. As already indicated, the gels should be prepared in such a way as to insure the final hydrogen ion concentration being favorable for the growth of the organisms, and it is desirable to prepare gels of low silicon dioxide concentration, since the greater the concentration the more rapidly the gels form and set. The slower gel formation gives more working time in which to bottle and handle the prepared liquid from which the gels are to form. As previously indicated, phosphoric acid is the best acid for preparation of the gels, since it has a greater buffering capacity at pH 7.0 than the other acids, forms a stronger gel, furnishes important nutrients, and the gels prepared with this acid form and set more slowly than do gels prepared with the other acids.

It will be understood that the gels are formed by pouring the liquid medium or gel liquid into any suitable containers in which the cultures are to be distributed, as for instance in bottles such as shown in Fig. 6 of the drawings. Using bottles of uniform size, each bottle is supplied with a quantity of the liquid insufficient to fill the bottle, but preferably sufficient to occupy more than half of the interior volume of the bottle; and preferably the bottles are held in slanted position during the gel formation and setting, so that the gels form as shown in Fig. 6 with a slanting surface for the organisms; though it will be understood that the bottles or containers may be held so that the gels will form with either a horizontal or vertical surface, as may be preferred. When formed with a slanting surface, the form of the gel and the quantity of medium within the bottle has an effect upon the strength of the gel or its capacity to withstand breakage in shipment. As shown in Fig. 6 the slanting surface of the gel extends from the point above the base of the bottle to a point on the interior shoulder of the bottle between the bottle neck and vertical side, thus giving considerable bracing effect to the base of the gel and a comparatively wide tip at the upper end. With this form, the gel is well braced in the bottle and the tip is less likely to break by jars in shipment.

In preparing the gels no dialysis is required.

The medium after it is bottled or tubed may be sterilized by autoclaving. After the gels have hardened they are ready to be inoculated with the proper bacteria. After the inoculation the bottles may be stored at room temperature, or they may be incubated at an appropriate temperature say 28° C. When a pronounced film growth is observed on the gels, the cultures are ready to be used.

Reverting to the matter of the time interval for gel formation, i. e. the time which may elapse between the period of mixing the acids with the silicate solution and the period at which gel formation takes place, tests with various media prepared from the aforesaid Tables I to V show that the molecular concentration of silicon dioxide in the medium has a pronounced effect, the time of gel formation rapidly increasing as the silicon dioxide concentration decreases. As to media produced from the same silicates and acids, the gel formation takes place more rapidly at about pH 6.8 to pH 7.0 than at lesser or higher hydrogen ion potential values. As to the effect on the rate of gelation, phosphoric acid is of distinctive advantage over the other acids, though in the case of gels produced from the No. 1 original silicate it appears that hydrochloric acid has an advantage in this respect over phosphoric acid. The gels of lower molecular concentrations, i. e. silicon dioxide concentration of from 0.1 to 0.5 mol. per liter, and preferably between 0.1 and 0.2 mol. per liter, are more desirable both from the standpoint of practicability for commercial production and for effects on the character and qualities of the gels and their superiority as bacteria culture media.

As illustrating the effects of different silicates, acids and molecular concentrations of silicon dioxide upon the time of gel formation, a few examples may be referred to. Gels produced by combining silicate solution made from No. 1 silicate with a single acid, and having a molecular concentration of 0.3 mol. $SiO_2$ per liter, formed in 21 minutes when made with hydrochloric acid, in 10 minutes when made with sulphuric acid, and in 18 minutes when made with phosphoric acid; while gels of corresponding composition having a molecular concentration of 0.2 mol. $SiO_2$ per liter formed respectively in 92 minutes, 40 minutes and 53 minutes.

Gels produced by combining a silicate solution made from No. 3 silicate with a single acid and having molecular concentration of 0.3 mol. $SiO_2$ per liter, formed in 8 minutes when made with hydrochloric acid, in 10 minutes when made with sulphuric acid, and in 15 minutes when made with phosphoric acid; while gels of corresponding compositions having a molecular concentration of 0.2 mol. $SiO_2$ per liter formed respectively in 30 minutes, 28 minutes and 48 minutes.

Phosphoric acid being in general superior with respect to the time of gel formation, the following examples are given:

Gels formed by combining a No. 1 silicate solution with phosphoric acid in different amounts to give different molecular concentrations of silicon dioxide formed in 9 minutes at a concentration of 0.4 mol. $SiO_2$ per liter, in 18 minutes at 0.3, in 53 minutes at 0.2, in 1320 minutes at 0.1. With gels from the No. 2 silicate solutions made with phosphoric acid, the times were 2 minutes at 0.5 concentration, 5 minutes at 0.4 concentration, 11 minutes at 0.3, 26 minutes at 0.2, 300 minutes at 0.1. For gels produced from the No. 3 silicate with phosphoric acid, the times were 7 minutes at 0.4 concentration, 15 minutes at 0.3, 48 minutes at 0.2, 420 minutes at 0.1.

With gels formed from the No. 4 silicate solution with phosphoric acid, the times were 9 minutes at 0.4 concentration, 22 minutes at 0.3, 55 minutes at 0.2, and 1200 minutes at 0.1.

The gels produced from the No. 5 silicate solution with phosphoric acid, the times for formation were 4 minutes at 0.5 concentration, 8 minutes at 0.4, 15 minutes at 0.3, 43 minutes at 0.2, and 270 minutes at 0.1.

In general the gels which are produced from the various silicates with the various acids with a molecular concentration of from 0.1 to 0.3 mol. $SiO_2$ per liter form sufficiently slowly for practical convenience; and gels of various compositions can be formed having higher molecular concentrations of silicon dioxide, though many gels having a concentration of 0.4 mol. $SiO_2$ per liter or higher form too quickly or in insufficient time for practical operations. Some of the gels having a molecular concentration of less than 0.2 mol. $SiO_2$ per liter require prolonged times up to twenty hours or more for forming. In general the gels of the lower concentrations, or between 0.1 and 0.2 mol. $SiO_2$ per liter, are preferable from the bacteriological standpoint.

As to hardness of the gels, comparative tests have been made by comparing the times required for a given weight to force a cutting instrument through different gels; the results indicating that the silicon dioxide molecular concentration of the medium very markedly affects the hardness, which increases with increase of such molecular concentration. Gels formed with phosphoric acid are slightly harder than those formed with hydrochloric or sulphuric acid. The particular silicate has little effect, with the possible exception of the No. 2 silicate, which shows slightly greater hardness of gel than the others. In view of the foregoing, it is apparent that the more desirable gels formed from the liquids of low silicon dioxide concentrations are comparatively soft. From the biological aspect, hardness of the gels is not essential or particularly important, and as a practical matter it might be of advantage to have soft gels, which can easily be broken up or disintegrated by shaking the bottle, as many farmers would desire a culture which can be shaken out from the bottle into a container of water. On the other hand, as a matter of neat appearance and to satisfy a large class of commercial demands, it is desirable to produce gels which will withstand rough handling and shipment without any breakage. Various mechanical tests involving the subjection of the bottled gels to jars, and also actual transportation tests, show that the gels of the lower silicon dioxide molecular concentrations or which are produced from silicates and acids alone are too weak to withstand shipment. The sterilization of the silicate gels also tends to reduce their strength by forming air bubbles within the medium, such gels after autoclaving exhibiting fine cracks. The inclusion in the medium of rather low concentrations of agar materially increases the strength of the gels, the agar functioning to produce a duplex effect, or functioning to hold together the molecular structure of the silicate gel and to mend the cracks within the gel structure resulting from autoclaving. Agar may be used in the gels in varying amounts. Shipment tests show that gels of low silicon dioxide concentration but having 1.0% or more of agar withstand shipment satisfactorily, besides which the quantity of gel and its form in the bottle has a favorable effect upon strength as previously stated.

Culture media prepared in accordance with the present invention are advantageous for many reasons. The silicate gels can be produced from cheap materials and can be economically and easily prepared. The gels may be prepared so nearly nitrogen free that the nitrogen fixing bacteria are practically the only organisms that find favorable conditions for growth. The silicate gels are superior to agar culture media in this respect. They produce luxuriant growth, great longevity as well as infectiveness of the organisms. The silicate gels of low silicon dioxide molecular concentration and containing agar have the property of extruding moisture. This extruded moisture forms a film satisfactory for the growth and continued life of the organisms. The silicate gels are superior to agar media in this respect. The silicate gels can be produced with the use of various acids to furnish desired or necessary nutrients or the chemical elements necessary for the growth of the organisms. The reaction which takes place between the acids combined with the silicate solution not only causes the formation of a silicate gel, but the salts formed furnish chemical elements for the growth of the organisms. Yeast water included in the media stimulates growth, and the sugars or carbohydrates, as sucrose, glucose, or combinations of sugars, alcohols or other carbohydrates may be included as energy sources. The growth of the organisms may in some cases be favorably influenced by the inclusion of oxidizing and reducing reagents in the medium. The growth produced on the silicate gels may be more slimy than that produced on ordinary bacteriological media. This is an advantage, since it is a recognized fact that the more slimy nodule-producing bacteria are more infective and they also tend to stick to the seed more tenaciously than do the less slimy organisms. Furthermore, the molecular concentration of the silicon dioxide may be varied to form either a soft or hard gel and the percentage of agar included in the medium may be varied so that a medium of any consistency may be manufactured to meet the demands of the trade. The silicate gels may be formed sufficiently hard and tough to withstand transportation without breakage, for use where it is desired to distribute cultures to be washed off from the surface of the medium without removing the medium itself from the bottle. By varying the silicon dioxide molecular concentration and the percentage of agar in the medium, the gels may be prepared so that they will readily break up and allow the entire medium and organism to be removed from the bottle. Thus gels of low silicon dioxide concentration which contain no agar or quantities of from 0.1% to 0.5% agar may be shaken into a liquid form and the gel and the organisms growing upon it readily removed from the bottle. Since silicate gels are in a colloidal state they have great adhesive properties, so that the entire mass may stick to the seed more tenaciously and may thus result in better inoculation of the seeds. The silicate gel media have the added advantage that a greater number of organisms will grow on the same area of these media than on common media.

Observation as to the growths of the alfalfa, red clover, bean and soybean cross-inoculation groups of organisms on silicate gels of various compositions prepared in accordance with the aforesaid tables numbered I to V, show these results. The alfalfa organism grows very abundantly on media produced from all of the aforesaid original silicates at any molecular concentration of silicon dioxide, with or without the inclusion of agar in the medium. The growth is generally abundant seven days after inoculation. Media produced from the original silicates Nos. 1 and 3 appear to give the best growths. The red clover organism grows best at the lower silicon dioxide concentrations. The bean organism grows better on the media produced from the No. 1 silicate than on media produced from the No. 3 silicate. The soybean organism rapidly produces abundant growth upon both gels, but the higher silicon dioxide concentrations are unfavorable for the growth of this organism. In general it may be stated that the lower silicon dioxide concentrations, between 0.15 to 0.2 mol. $SiO_2$ per liter, are best for the growth of Rhizobia, and that the gels produced from the original silicates Nos. 1 and 3 are superior as compared with the other original silicates herein referred to.

A comparison as to the amount of growth and number of organisms per bottle (for inoculation of one bushel of seed) was made between Rhizobium cultures on silicate gels made from silicates Nos. 1 and 3 and ordinary cultures on agar media containing yeast water and mannitol. The silicate gels used in this comparison were of a molecular concentration of silicon dioxide from 0.15 to 0.20 mol. per liter and contained 1.2% agar. Both the silicate gels and the agar yeast mannitol gels were inoculated twenty-four hours after preparation of the respective gels. Observation of the amount of growth and a plate count of the number of bacteria in each bottle were determined at weekly intervals. The data obtained from these determinations indicate that these silicate gels are superior to the agar yeast water mannitol media for the growth of the alfalfa organism, and also for the soybean organism. The gels from No. 1 silicate at 0.15 $SiO_2$ concentration gave optimum conditions for the growth of the pea organism. The growth of the organisms of the alfalfa and pea groups on the silicate gels is so abundant that it is fully 1/8" or more in thickness. The growth is also very slimy. The number of organisms does not decrease materially after seven weeks' growth.

A further comparison has been made with alfalfa organisms after five weeks' growth respectively upon the agar yeast water mannitol media and the No. 1 silicate gels of 0.15 mol. $SiO_2$ per liter and 1.2% agar. Suspensions of various dilutions of the respective organisms were made and plants were inoculated. It was determined that the alfalfa organism grown on the ordinary medium produced nodules at a dilution of 100 billion, while the organisms grown on the silicate gel produced nodules in the thousand billion dilution. By means of McCrady's tables a value of 8 billion organisms is obtained for the culture on the ordinary medium and a value of 350 billion for the culture on the silicate gels. Since the plate count is greater and the value obtained by inoculation into plants is also greater for the silicate gels than for the ordinary media, it is apparent that the silicate gels are superior to the other for the growth of the nodule organisms tested.

In general, properly prepared silicate gels furnish culture media fully as satisfactory as and in many cases more satisfactory than ordinary media for the growth of various nitrogen fixing bacteria. I have successfully produced on the silicate gels luxuriant cultures of various Rhizobium organisms, including alfalfa, red clover, bean, soybean, pea, lupine, cowpeas and lespedeza organisms.

In the following claims, a low silicon dioxide molecular concentration means not in excess of 0.5 mol. per liter, and the phrase "approximately neutral pH value" means from about pH 6.8 to about pH 7.2.

What I claim as my invention and desire to secure by Letters Patent is:

1. The improvement in the art of producing bacteria cultures for seed inoculation which consists in preparing silicate gels having a silicondioxide molecular concentration of from 0.1 to 0.5 mol. per liter and containing the essential elements for microbial growth, inoculating said gels with bacteria of the genus Rhizobium, and nursing the inoculated gels until development thereon of an organism of said bacteria in the form of a film.

2. The product for use for seed inoculation comprising a silicate gel having thereon in the form of a film an organism of bacteria of the genus Rhizobium, said gel having a silicon-dioxide molecular concentration of from 0.1 to 0.5 mol. per liter and containing the essential elements for microbial growth.

3. A product of the character set forth in claim 2 in which the silicon-dioxide molecular concentration of the silicate gel is from 0.1 to 0.2 mol. per liter.

4. A product of the character set forth in claim 2 in which the silicate gel has a silicon-dioxide molecular concentration of from 0.1 to 0.2 mol. per liter and contains from 0.1% to 2.00% agar.

ADOLPH A. HENDRICKSON.

CERTIFICATE OF CORRECTION.

Patent No. 2,098,918.  November 9, 1937.

ADOLPH A. HENDRICKSON.

It is hereby certified that error appears in the printed specification of the above numbered patent requiring correction as follows: Page 1, second column, line 53, for the word "grand" read brand; page 5, first column, line 43, for "1,708" read 1.708; and that the said Letters Patent should be read with these corrections therein that the same may conform to the record of the case in the Patent Office.

Signed and sealed this 11th day of January, A. D. 1938.

(Seal)

Henry Van Arsdale,
Acting Commissioner of Patents.

in many cases more satisfactory than ordinary media for the growth of various nitrogen fixing bacteria. I have successfully produced on the silicate gels luxuriant cultures of various Rhizobium organisms, including alfalfa, red clover, bean, soybean, pea, lupine, cowpeas and lespedeza organisms.

In the following claims, a low silicon dioxide molecular concentration means not in excess of 0.5 mol. per liter, and the phrase "approximately neutral pH value" means from about pH 6.8 to about pH 7.2.

What I claim as my invention and desire to secure by Letters Patent is:

1. The improvement in the art of producing bacteria cultures for seed inoculation which consists in preparing silicate gels having a silicon-dioxide molecular concentration of from 0.1 to 0.5 mol. per liter and containing the essential elements for microbial growth, inoculating said gels with bacteria of the genus Rhizobium, and nursing the inoculated gels until development thereon of an organism of said bacteria in the form of a film.

2. The product for use for seed inoculation comprising a silicate gel having thereon in the form of a film an organism of bacteria of the genus Rhizobium, said gel having a silicon-dioxide molecular concentration of from 0.1 to 0.5 mol. per liter and containing the essential elements for microbial growth.

3. A product of the character set forth in claim 2 in which the silicon-dioxide molecular concentration of the silicate gel is from 0.1 to 0.2 mol. per liter.

4. A product of the character set forth in claim 2 in which the silicate gel has a silicon-dioxide molecular concentration of from 0.1 to 0.2 mol. per liter and contains from 0.1% to 2.00% agar.

ADOLPH A. HENDRICKSON.

CERTIFICATE OF CORRECTION.

Patent No. 2,098,918. November 9, 1937.

ADOLPH A. HENDRICKSON.

It is hereby certified that error appears in the printed specification of the above numbered patent requiring correction as follows: Page 1, second column, line 53, for the word "grand" read brand; page 5, first column, line 43, for "1,708" read 1.708; and that the said Letters Patent should be read with these corrections therein that the same may conform to the record of the case in the Patent Office.

Signed and sealed this 11th day of January, A. D. 1938.

(Seal)

Henry Van Arsdale,
Acting Commissioner of Patents.

CERTIFICATE OF CORRECTION.

Patent No. 2,098,918.

November 9, 1937.

ADOLPH A. HENDRICKSON.

It is hereby certified that error appears in the printed specification of the above numbered patent requiring correction as follows: Page 1, second column, line 53, for the word "grand" read brand; page 5, first column, line 43, for "1,708" read 1.708; and that the said Letters Patent should be read with these corrections therein that the same may conform to the record of the case in the Patent Office.

Signed and sealed this 11th day of January, A. D. 1938.

Henry Van Arsdale,
Acting Commissioner of Patents.

(Seal)